United States Patent [19]

Yamamoto et al.

[11] Patent Number: 4,486,677

[45] Date of Patent: Dec. 4, 1984

[54] ENCASED ELECTRIC MOTOR EMPLOYING GAS AS HEAT DISSIPATING MEANS

[75] Inventors: Sakuei Yamamoto; Hiroshi Inao; Kiyonori Tokumitsu; Mitsuhiro Nishida, all of Fukuoka; Takatoshi Ishikawa, Maebaru; Shigekazu Sakabe, Amagasaki, all of Japan

[73] Assignee: Mitsubishi Denki Kabushiki Kaisha, Tokyo, Japan

[21] Appl. No.: 490,414

[22] Filed: May 2, 1983

[30] Foreign Application Priority Data

Apr. 30, 1982 [JP] Japan .................................. 57-73759
Sep. 16, 1982 [JP] Japan .................................. 57-162819

[51] Int. Cl.³ .............................................. H02K 9/08
[52] U.S. Cl. ........................................ 310/64; 310/88; 165/104.13
[58] Field of Search ............... 310/52, 53, 55, 45, 310/56, 87, 57, 89, 64, 254, 85, 258, 86, 88; 165/104.13

[56] References Cited

U.S. PATENT DOCUMENTS

| 1,543,502 | 6/1925 | Hobart | 310/86 |
|---|---|---|---|
| 1,914,714 | 6/1933 | Gold | 310/86 |
| 2,004,866 | 6/1935 | Haldeman | 310/86 |
| 2,128,544 | 8/1938 | Surjaninoff | 310/86 |
| 2,727,164 | 12/1955 | Radice | 310/86 |
| 2,734,459 | 2/1956 | Zimsky | 310/86 |
| 3,229,130 | 1/1966 | Drouard | 310/86 |
| 3,240,967 | 3/1966 | Krastchew | 310/55 |
| 3,777,194 | 12/1973 | Schaefer et al. | |

FOREIGN PATENT DOCUMENTS 141741 11/1981 Japan ................................. 310/64

Primary Examiner—R. Skudy
Attorney, Agent, or Firm—Wenderoth, Lind & Ponack

[57] ABSTRACT

In an encased electric motor within a casing, an electrically insulating varnish is applied by vacuum impregnation to the inside surfaces of the casing and to the outer surface of the stator of the motor. The remaining empty space within the casing is filled with a heat conducting gas mixture comprising approximately 60–90% by volume of helium, with the remaining percentage being an electrically insulating gas having better electrically insulating properties than helium, such as sulphur hexafluoride. This encased motor is much lighter than conventional encased motors in which the stator enclosure is filled with a heat conducting resin potting compound and avoids warping damage which frequently occurs in conventional encased motors due to thermal expansion of the heat conducting resin potting compound.

5 Claims, 2 Drawing Figures

ENCASED ELECTRIC MOTOR EMPLOYING GAS AS HEAT DISSIPATING MEANS

BACKGROUND OF THE INVENTION

The present invention relates to encased motors of the type having means for dissipating the heat generated by the stator coils, and in particular, it relates to an encased motor wherein those means comprise a gas mixture having good heat conducting qualities sealed within the can.

In canned motors according to the prior art, it is common to completely fill the stator enclosure of the motor with a potting compound comprising a resin having excellent heat conductivity. The potting compound conducts the heat produced by the stator coils to the surface of the casing, where the heat is dissipated. Although resins are excellent from the standpoint of heat dissipation, they have a number of disadvantages. First, they are costly. Second, they greatly increase the weight of the encased motor. The third and the biggest disadvantage is that they expand due to heating when the motor is overloaded, and this expansion may produce warping and other physical distortion of the walls of the casing. Accordingly, this means of heat dissipation is not satisfactory.

SUMMARY OF THE INVENTION

It is the object of the present invention to provide an encased electric motor which is not subject to warping during a motor overload.

It is a further object of the present invention to provide a canned electric motor which is light in weight.

It is yet another object of the present invention to provide an encased electric motor which is easier and cheaper to manufacture than presently existing an encased electric motors.

An embodiment of an encased electric motor according to the present invention comprises a double-walled, airtight casing, a stator rigidly mounted within the casing between the double walls, an electrically insulating varnish applied in a thin layer to the inner surfaces of the casing between the double walls of the casing and to the outer surface of the stator, and a heat conducting gas hermetically sealed inside the can between the double walls and filling all empty spaces within the casing. The heat conducting gas comprises approximately 60-90% by volume of helium and approximately 40-10% by volume of a gas having better electrical insulating properties than helium such as sulphur hexafluoride or air.

By filling the empty spaces within the casing with a heat conducting gas mixture instead of with a potting compound, the weight of the canned motor casing be greatly reduced, and all possibility of warping damage to the casing due to thermal expansion can be eliminated.

DESCRIPTION OF THE PREFERRED EMBODIMENTS

Figure 1:
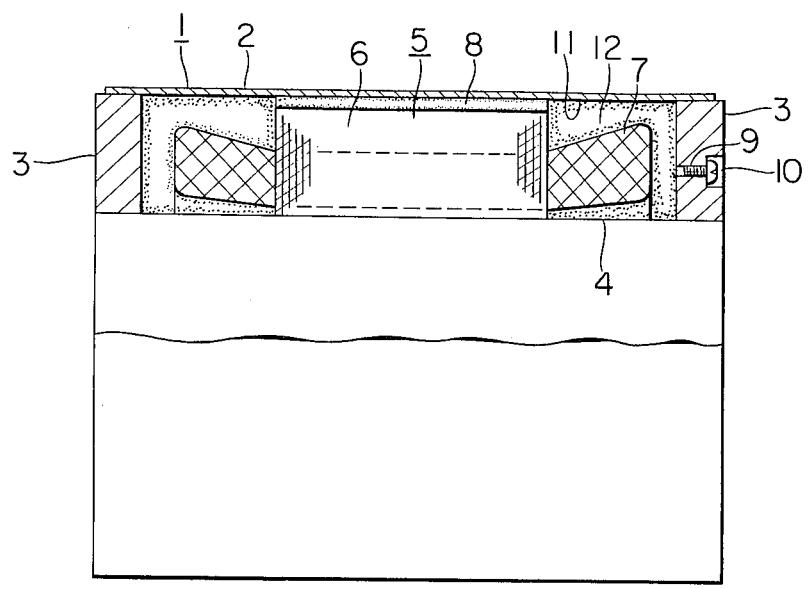
FIG. 1 is a partially sectional side view of an embodiment of an encased motor according to the present invention.

An embodiment of an encased motor according to the present invention will now be described while making reference to FIG. 1, which shows a partially sectional side view of this embodiment.

In the figure, reference numeral 1 indicates a double-walled, airtight casing. Stator frame 2 of the motor comprises a cylindrical shell which also serves as the outer wall of the casing 1. Ring-shaped end plates 3 are welded with airtight welds to the ends of the stator frame 2 and form part of the end surfaces of the casing 1. An inner cylindrical shell 4 is welded at its ends to the end plates 3 and serves as the inner wall of the casing 1. The space between the stator frame 2 and the inner cylindrical shell 4 serves as an airtight stator enclosure. The rotor and other parts (not shown) of the encased motor are housed within the inner cylindrical shell 4.

A stator 5 comprises a stator core 6 rigidly mounted inside the casing 1 and also comprises stator coils 7 wound about the stator core 6. The stator core 6 is formed with a plurality of axial slits 8 in its outer surface extending for the entire length of the core 6. The present embodiment contains 5 circumferentially spaced slits 8, but this number may be varied according to circumstances. A threaded tap hole 9 is formed in one of the end plates 3, and a screw 10 screws into the tap hole 9, forming a hermetic seal. An electrically insulating, thermosetting varnish 11 (for example, an epoxy varnish, a polyester varnish, or an epoxy-polyester blend) is applied as a thin layer to the inner walls of the casing 1 between the stator frame 2 and the inner cylindrical shell 4. The varnish 11 also covers the outer surface of the stator 5, impregnating the stator core 6 and filling the spaces between the individual windings of the stator coils 7. This varnish 11, which is applied at the time of assembly of the motor, is not to be confused with the thin layer of varnish applied to the stator core 6 at the time of its manufacture. The varnish 11 serves to increase the rate of heat dissipation from the stator 5.

A heat conducting gas mixture 12 fills the remaining empty space within the stator enclosure. The heat conducting gas mixture 12 comprises approximately 60-90% by volume of helium (which has high heat conductivity) and approximately 40-10% by volume of a gas having better electrical insulating properties than helium. The purpose of the electrically insulating gas is to prevent the production of coronas by the stator coils 7 and to prevent a decrease in electrical insulation thereof. The preferred electrically insulating gas used in the gas mixture is sulphur hexafluoride, but air or other gases having better electrical insulating properties than helium may be used instead.

The varnish 11 is applied as a thin layer to the inside of the casing by vacuum impregnation after the motor has been assembled and mounted inside the casing 1. Varnish 11 is poured into the casing via the tap hole 9 and then hardened by the application of heat. The axial slits 8 formed in the stator core are for the purpose of allowing the varnish 11 (as well as the gas mixture 12) to flow to the regions of the stator enclosure furthest removed from the tap hole 9. After the varnish 11 has hardened inside the casing 1, all remaining empty spaces within the stator enclosure are filled with the heat conducting gas mixture 12, also via the tap hole 9. The screw 10 is then threaded into the tap hole 9, hermetically sealing the gas mixture 12 inside the casing 1.

During operation of the motor, the varnish 11 and the heat conducting gas mixture 12 conduct heat away from the stator core 6 and stator coils 7 to the stator frame 2 and end plates 3, where the heat is dissipated. The encased motor according to the present invention is much lighter than motors according to the prior art in which the stator enclosure is filled with a potting compound, and there is no tendency for the casing to become warped by expansion during a motor overload.

Figure 2:
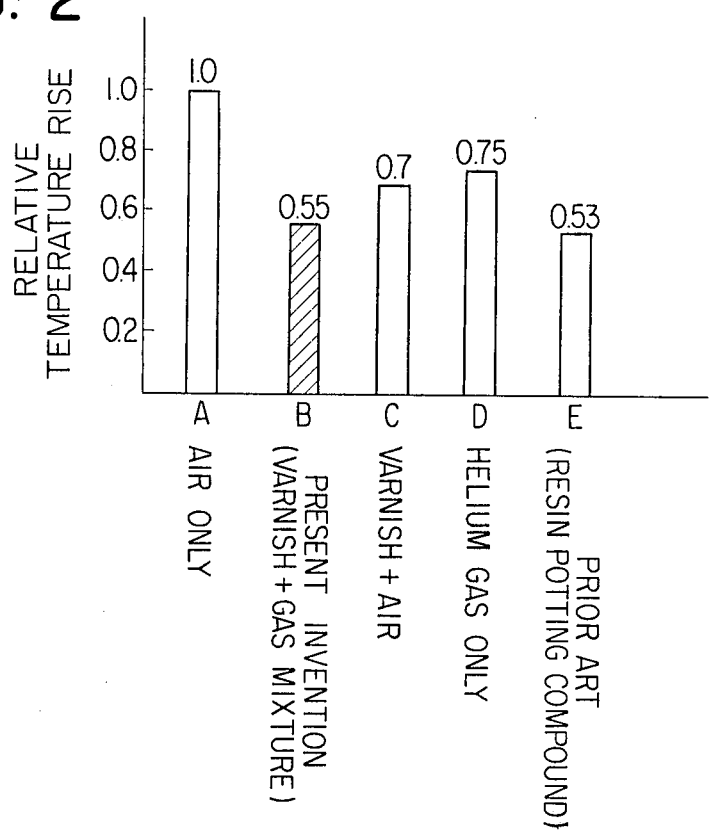
FIG. 2 is a graph comparing the heat rise inside the stator enclosures of a number of different encased motors, each motor using a different substance as a heat conducting filling for the stator enclosure.

Furthermore, the ability of the heat conducting gas 12 together with the varnish 11 to dissipate heat is nearly as good as that of the heat conducting potting compounds conventionally used in canned motors, which can be seen from FIG. 2, which is a bar graph showing the temperature rise within the stator enclosure of various encased motors during motor operation, each motor having a different material in the stator enclosure as a heat conducting filling.

The value shown in the figure for a given motor is the ratio of the temperature rise in the stator enclosure of that motor to the temperature rise in a motor having only air (no varnish) in the stator enclosure (bar A). Bar B represents the temperature rise in an encased motor according to the present invention. Bar C is for an encased motor having a coating of varnish on the inside of the stator enclosure as in the present invention but with air used to fill the stator enclosure instead of a heat conducting gas mixture. Bar D is for a stator enclosure filled only with helium gas and without a coating of varnish on the inside of the stator enclosure. Bar E is for an encased motor according to the prior art, in which the stator enclosure is completely filled with a resin potting compound.

Although the preferred embodiment of the present invention employs both a varnish 11 and a heat conducting gas 12, it is possible to dispense with the electrically insulating varnish 11 and to fill the stator enclosure with the gas mixture 12 alone. Although the ability to dissipate heat of the gas mixture 12 alone is not as good as that of the gas mixture 12 together with the electrically insulating varnish 11, an encased motor not using varnish is much easier and cheaper to manufacture.

What is claimed is:

1. An encased electric motor comprising:
   an airtight cylindrical casing having inner and outer walls;
   a stator rigidly mounted within said casing between said inner and outer walls; and
   a heat conducting gas mixture sealed within said casing between said inner and outer walls, wherein said heat conducting gas mixture comprises approximately 60-90% by volume of helium and 40-10% by volume of an electrically insulating gas having better electrical insulating properties than helium.

2. An encased electric motor as claimed in claim 1, wherein said electrically insulating gas is sulphur hexafluoride.

3. An encased electric motor as claimed in claim 1, wherein said electrically insulating gas is air.

4. An encased electric motor as claimed in claim 2, further comprising an electrically insulating varnish applied to the inside surfaces of said casing between said inner and outer walls and to the outer surfaces of said stator.

5. An encased electric motor as claimed in claim 3, further comprising an electrically insulating varnish applied to the inside surfaces of said casing between said inner and outer walls and to the outer surfaces of said stator.

* * * * *